United States Patent Office 3,497,572
Patented Feb. 24, 1970

3,497,572
HIGH IMPACT RESIN COMPOSITIONS
Clifford W. Childers and Jerry T. Gruver, Bartlesville, Okla., assignors to Phillips Petroleum Company, a corporation of Delaware
No Drawing. Filed Aug. 24, 1967, Ser. No. 662,895
Int. Cl. C08f 33/08
U.S. Cl. 260—876                    10 Claims

ABSTRACT OF THE DISCLOSURE

High impact resin compositions are formed from blending a monovinyl substituted aromatic compound/acrylonitrile resin, a rubbery block copolymer of a conjugated diene and a monovinyl substituted aromatic compound, a rubbery random copolymer of a conjugated diene and acrylonitrile, optionally, a resinous block copolymer of a monovinyl substituted aromatic compound and a conjugated diene, and a peroxy oxygen-containing compound, and heating at a temperature which causes decomposition of the peroxy oxygen-containing compound.

---

This invention relates to a new and improved method for making high impact resins and the compositions themselves. In one aspect this invention relates to high impact monovinyl substituted aromatic compound/acrylonitrile compositions with improved properties and the compositions thereof. In another aspect this invention relates to a method for making styrene/acrylonitrile copolymer compositions with other polymers which compositions have improved oil resistance and are also good substitutes for ABS resins, and the compositions thereof.

Heretofore ABS, i.e. acrylonitrile - butadiene-styrene, polymer compositions have been disclosed.

It has now been found that a resinous composition can be more simply made by blending various polymers and which will have properties that allow it to be substituted for ABS resins and which in addition will have superior chemical resistance, particularly to the action of vegetable oils, fats, and the like. Such compositions are formed when at least one copolymer of a monovinyl substituted aromatic compound and acrylonitrile is blended with at least one rubbery block copolymer formed from at least one conjugated diene and at least one monovinyl substituted aromatic compound, and at least one rubbery random copolymer of a conjugated diene and acrylonitrile, and the blend is mixed with at least one peroxy oxygen-containing material and the resulting mixture is subjected to a temperature sufficient to decompose the peroxy oxygen-containing material.

Further according to this invention, even better results are obtained when, in addition to the above polymer components of the blend of this invention, there is also added at least one resinous block copolymer formed from at least one conjugated diene and at least one monovinyl substituted aromatic compound.

Accordingly, it is an object of this invention to provide a new and improved method for making resinous compositions, more specifically monovinyl substituted aromatic compound/acrylonitrile copolymer compositions, more preferably styrene/acrylonitrile copolymer compositions.

It is another object of this invention to provide a new and improved resinous composition, preferably monovinyl substituted aromatic compound/acrylonitrile copolymer-containing compositions, more preferably styrene/acrylonitrile copolymer-containing compositions.

Other aspects, objects, and advantages of this invention will be apparent to one skilled in the art from the following description and appended claims.

According to this invention there is provided a method for making resinous compositions which comprises blending (1) at least one of monovinyl substituted aromatic compound/acrylonitrile copolymer containing from about 20 to about 40 weight percent acrylonitrile based on the total weight of the copolymer, the copolymer being present in the range of from about 50 to about 93, preferably from about 45 to about 82, weight percent based on the total weight of the blend, (2) at least one rubbery block copolymer formed from at least one conjugated diene and at least one monovinyl substituted aromatic compound, the rubbery block copolymer being present in an amount of from about 5 to about 30, preferably from about 10 to about 25, weight percent based on the total weight of the blend, (3) at least one resinous block copolymer of at least one monovinyl susbtituted aromatic compound and at least one conjugated diene, the copolymer being present in an amount of from about 0 to about 20, preferably from about 0.5 to about 20, still more preferably from about 2 to about 15, weight percent based on the total weight of the blend, (4) at least one rubbery random copolymer of at least one conjugated diene and acrylonitrile, the copolymer being present in an amount of from about 2 to about 20, preferably from about 6 to about 15, weight percent based on the total weight of the blend, and (5) at least one peroxy oxygen-containing material; and then subjecting the resulting peroxy oxygen-containing blend of polymers to a temperature sufficient to decompose the peroxy oxygen-containing material.

The peroxy oxygen-containing blend can be subjected to heating either during blending of the polymers or after blending of the polymers or both, at a temperature at or above that which causes rapid decomposition of the peroxy oxygen-containing material or materials added to the polymer blend.

The monovinyl substituted aromatic compound/acrylonitrile resins used in this invention are generally available commercially and can be prepared by any method known in the art. These resins can be uniform or heterogeneous in composition depending upon the method of preparation. For example, the acrylonitrile content can vary as the polymerization proceeds. The monomer sequence in the polymer molecules of the resins can be random or nonrandom, homopolymer blocks of the monovinyl substituted aromatic compound being formed in the latter case. Two or more of these resins can be employed in a single blend if desired.

The rubbery and resinous block copolymers which are blended with the acrylonitrile containing copolymer are generally available commercially and can be prepared by any method known in the art. The block copolymers are formed by solution polymerization techniques so that the block structure is characterized in that the molecules of the final polymer products are composed of contiguous blocks, or segments, or different polymeric types, for example, one of the blocks forming the polymer chain can be a homopolymer of a conjugated diene or copolymer of a conjugated diene and a monovinyl substituted aromatic compound while an adjacent block in that same chain can be a homopolymer of a monovinyl substituted aromatic compound or copolymer of a monovinyl substituted aromatic compound and a conjugated diene. It should be noted that one or more conjugated diene or monovinyl substituted aromatic copolymer blocks can be present in the block copolymers used in this invention.

The rubbery block copolymer of this invention contains from about 50 to about 95 weight percent conjugated diene based on the total weight of the monomers employed to make the block copolymer and from about 5 to about 50 weight percent monovinyl substituted aromatic compound based on the total weight of the monomers employed to make the block copolymer. The conjugated diene block of the rubbery block copolymer contains at least 50 weight percent conjugated diene based on the total weight of the conjugated diene block. The monovinyl substituted aromatic block of the rubbery block copolymer is resinous and preferably a homopolymer of a monovinyl substituted aromatic compound but can be a copolymer which contains at least 80 weight percent monovinyl substituted aromatic compound based on the total weight of the monovinyl substituted aromatic block. The rubbery block copolymer contains from about 5 to about 75 weight percent of the monovinyl substituted aromatic block based on the total weight of the rubbery block copolymer.

The resinous block copolymer contains from about 50 to about 5 weight percent monovinyl substituted aromatic compound or compounds, the remaining about 5 to about 50 weight percent being essentially at least one conjugated diene. The monovinyl substituted aromatic block of the resinous block copolymer is preferably a homopolymer of a monovinyl substituted aromatic compound but can be a copolymer of a monovinyl substituted aromatic compound and a conjugated diene containing at least 90 weight percent monovinyl substituted aromatic compound based on the total weight of the monovinyl substituted aromatic block. The conjugated diene block of the resinous block copolymer contains at least 50 weight percent of at least one conjugated diene based on the total weight of the conjugated diene block, the remainder being essentially a monovinyl substituted aromatic compound.

The rubbery random copolymers of this invention are generally available commercially and can be prepared by any method known in the art. These copolymers are different from block copolymers in that the monomers are randomly dispersed in the polymer throughout. These random copolymers contain from about 15 to about 40 weight percent acrylonitrile the remainder being essentially at least one conjugated diene in the amount of from about 60 to about 85 weight percent conjugated diene, both weight percents being based on the total weight of the random copolymer.

The conjugated dienes that can be employed in preparing the copolymers applicable to this invention are those containing from 4 to 10 carbon atoms per molecule, for example, 1,3-butadiene, isoprene, 1,3-pentadiene (piperylene), 1,3-hexadiene, 2,3-dimethyl-1,3-butadiene, 1,3-octadiene, 4-ethyl-1,3-hexadiene, 1-phenyl-1,3-butadiene, and the like. Preferred conjugated dienes are butadiene, isoprene, and piperylene.

Monovinyl substittued aromatic compounds that can be employed for preparing the copolymers of this invention are those containing from 8 to 12 carbon atoms per molecule, for example, styrene, 3 - methylstyrene, 4-methylstyrene, 4-isopropylstyrene, 2,4-dimethylstyrene, 1-vinylnaphthalene, 2-vinylnaphthalene, and the like.

Solution-polymerized copolymers having block distribution of the monomers in the copolymer chain can be formed by polymerizing a first monomer in the presence of an organolithium catalyst to form a homopolymer, and subsequently adding a second monomer to the polymerization zone and continuing the polymerization operation. Block copolymers can also be formed by contacting a mixture of the selected conjugated diene and monovinyl substituted aromatic compound with an organolithium catalyst in the presence of a hydrocarbon diluent selected from the group consisting of aromatic, paraffinic and cycloparaffinic hydrocarbons. The polymerization is generally carried out at a temperature within the range of from about −20 to about 150, preferably from about −10 to about 80° C. and at pressure sufficient to maintain the materials present substantially in the liquid phase. The pressure will depend upon, inter alia, the particular materials being polymerized, the diluent being employed, and the temperature at which the polymerization is carried out. Pressures higher than autogenous can be employed if desired by the use of any suitable method such as the pressurization of the reactor with an inert gas.

The organolithium compounds generally used correspond to the formula $R(Li)_x$ wherein R is a hydrocarbon radical selected from the group consisting of aliphatic, cycloaliphatic, and aromatic radicals and combinations thereof and $x$ is an integer from 1 to 4, inclusive. The aliphatic and cycloaliphatic radicals can be saturated or contain olefinic unsaturation. The R in the formula has a valence equal to the integer, and preferably contains from 1 to 20, inclusive, carbon atoms, although it is within the scope of the invention to use higher molecular weight compounds. Examples of these compounds include methyllithium,
isopropyllithium,
n-butyllithium,
tert-octyllithium,
n-decyllithium,
phenyllithium,
naphthyllithium,
4-butylphenyllithium,
p-tolyllithium,
4-phenylbutyllithium,
cyclohexyllithium,
4-butylcyclohexyllithium,
4-cyclohexylbutyllithium,
dilithiomethane,
1,4-dilithiobutane,
1,10-dilithiodecane,
1,20-dilithioeicosane,
1,4-dilithiocyclohexane,
1,4-dilithio-2-butene,
1,8-dilithio-3-decene,
1,4-dilithiobenzene,
1,4-dilithionaphthalene,
1,2-dilithio-1,3-diphenylethane,
9,10-dilithio-9,10-dihydroanthracene,
1,2-dilithio-1,3-diphenyloctane,
1,3,5-trilithiopentane,
1,5,15-trilithioeicosane,
1,3,5-trilithiocyclohexane,
1,2,5-trilithionaphthalene,
1,3,5-trilithoanthracene,
1,3,5,8-tetralithiodecane,
1,5,10,20-tetralithioeicosane,
1,2,4,6-tetralithiocyclohexane,
1,2,3,5-tetralithio-4-hexylanthracene,
1,3-dilithio-4-cyclohexane,
and the like.

Catalysts other than the hydrocarbon-lithium compounds hereinbefore mentioned can be used to prepare the polymers of this invention. For example, the catalysts disclosed in U.S. Patent 3,215,679, the disclosure of which is hereby incorporated herein by reference, can be used in lieu of hydrocarbon-lithium catalysts.

The amount of catalyst used in the preparation of block copolymers can vary over a wide range but will generally be at least 0.05 part by weight of the organolithium compound per 100 parts by weight of the total monomers to be polymerized in the process. The upper limit for the amount of organolithium used depends primarily upon catalyst solubility and the desired inherent viscosity of the polymer resulting from the polymerization. A preferred effective catalyst level is from about 0.1 to about 2 parts by weight of organolithium per 100 parts by weight of total monomers charged to the polymerization zone.

The hydrocarbon diluent employed can vary widely but is preferably a hydrocarbon of one of the above-mentioned types containing from 3 to 12, inclusive, carbon atoms. Examples of such diluents include propane, n-butane, isobutane, n-pentane, n-hexane, n-decane, n-dodecane, cyclohexane, cyclopentane, methylcyclohexane, benzene, toluene, xylene, and the like. Mixtures of two or more of these hydrocarbons can be employed.

Block copolymers prepared by using an organomonolithium initiator can be treated with a polyfunctional agent to terminate the polymerization and couple together two or more block copolymers.

Suitable methods of making block copolymers can be found in U.S. Patent 3,030,346, the disclosure of which is incorporated herein by reference. Other suitable methods of making block copolymers as well as random copolymers utilizable in this invention are found in U.S. Patent 2,975,160, the disclosure of which is incorporated herein by reference.

At the completion of the above polymerization reactions the reaction mixture is inactivated by the addition of one or more conventional catalyst-inactivating materials such as water, alcohols, organic and inorganic acids, and the like. Also, suitable additives such as antioxidants, stabilizers, pigments, and the like can be added to the copolymer product.

The peroxy compounds which can be employed in this invention include organic and inorganic peroxides. The term "organic peroxides" is meant to include the hydroperoxides, unless otherwise stated, and to encompass compounds containing from 4 to 40 carbon atoms per molecule, inclusive. The organic peroxides can also be substituted with nonperoxy members such as halogen, hydroxy radicals, ether and/or ester linkages, and the like. The inorganic peroxides include calcium peroxide, barium peroxide, zinc peroxide, lead peroxide and mixtures thereof.

Examples of suitable peroxides include: methyl n-propyl peroxide, diethyl peroxide, ethyl isopropyl peroxide, di-tert-butyl peroxide, di-n-hexyl peroxide, n-hexyl n-decyl peroxide, dieicosyl peroxide, dicyclohexyl peroxide, dicyclopentyl peroxide, bis(2,4,6 - trimethylcyclohexyl) peroxide, bis(3,5-dichlorocyclohexyl) peroxide, bis(4-phenylcyclohexyl) peroxide, bis(2-cyclohexenyl) peroxide, bis(4-methyl-2-hexenyl) peroxide, bis(4-oxtenyl) peroxide, dipropionyl peroxide, dilauroyl peroxide, dibenzoyl peroxide, dicrotonyl peroxide, dibenzyl peroxide, dicumyl peroxide, methyl 2-n-propyl-3-butenyl peroxide, bis(alpha-ethylbenzyl) peroxide, bis[diisopropyl(4-isopropylphenyl)methyl] peroxide, bis[dimethyl-(4-tert-butylphenyl)methyl] peroxide, benzyl alpha-methylbenzyl peroxide, bis[(4-chlorobenzoyl)] peroxide, bis(2,4-dichlorobenzoyl) peroxide, bis(2-propoxy-n-hexyl) peroxide, n-pentyl 5,8-diphenyldodecyl peroxide, bis(9,10-dihydroxydecyl) peroxide, 2,5-di(tert-butylperoxy)-2,5-dimethylhexane, bis(2-hydroxyheptyl) peroxide, tert-butyl hydroperoxide, dodecyl hydroperoxide, eicosyl hydroperoxide, triacontanyl hydroperoxide, 4-methylcyclohexyl hydroperoxide, phenylcyclohexane hydroperoxide, 3-cyclohexenyl hydroperoxide, 3-phenyl-2-cyclohexenyl hydroperoxide, 4-cyclopentyl-n-butyl hydroperoxide, cumene hydroperoxide (dimethylphenylhydroperoxymethane), diisopropylbenzene hydroperoxide [dimethyl-(4-isopropylphenyl) hydroperoxymethane], (4-ethoxyphenyl)methyl hydroperoxide, di - n-hexyl-4-hydroxyphenylhydroperoxymethane, dimethyl(3 - methoxyphenyl)hydroperoxymethane, peroxybenzoic acid, peroxybutyric acid, peroxydodecanoic acid, tert-butyl peroxybenzoate, di-tert-amyl diperoxyphthalate, and tert-dodecyl peroxyacetate.

Peroxides formed by the oxidation of terpene hydrocarbons such as pinane, alpha-pinene, p-methane, and turpentine can also be used.

The peroxides which are preferred in this invention are those which decompose at a temperature of at least 250° F. The upper maximum decomposition temperature is dictated primarily by practicality rather than functionality, i.e. it should be such that substantially complete decomposition of the peroxide occurs during preparation of the composition. The amount of peroxy compound or compounds employed according to this invention is that which will provide from about 0.25 to about 6, preferably from about 0.35 to about 4.5, gram millimoles of peroxy oxygen (—O—O—) per 100 grams of conjugated diene in the above-described copolymer or copolymers.

The various polymeric components in the peroxy oxygen-containing compound or compounds that form the blend of this invention can be mixed or blended in any conventional manner, the primary desired result being an intimate mixture of all the components. It is presently preferred that the mixing, when the peroxy compound is present, be carried out in the substantial absence of air in order to effect maximum property improvement. However, it does not appear at present to be mandatory that substantially all air be excluded, for example, satisfactory results can be obtained by Banbury mixing if the Banbury is merely substantially full. Generally, any internal mixer such as Banbury, twin screw extruder, Brabender Plastograph, and the like can be employed. Mixing in a vacuum or an inert atmosphere such as nitrogen can also be advantageously employed in this invention. It should be noted that various blending techniques can be employed, e.g., blending only a portion of one or more components, preferably all the rubber components and a portion of the polystyrene, in a first mixing cycle and then adding the remainder of those one or more components, such as the remainder of the polystyrene, for additional mixing in a second mixing cycle.

Although the mixing temperature when the peroxy compound is present in the mix is that sufficient to substantially decompose the peroxy compound, in general, the mixing temperature will most times fall in the range of from about 250 to about 600, preferably from about 300 to about 500° F. The mixing time, as with the mixing temperature, can vary widely but will generally be in the range of from about 1 to about 30, preferably from about 2 to about 15 minutes. The blend can also be heated to similar temperatures after mixing is terminated or the heating operation can overlap the mixing period and the period following the termination of the mixing operation.

The blends of this invention can also contain other ingredients normally included in such compounds. For example, antioxidants, pigments, dyes, fillers, stabilizers, plasticizers, foaming agents, and the like can be included in these blends.

The blends of this invention are useful as substitutes for conventional ABS resins and therefore have utilities which are the same as those currently known for ABS resins. For example, the polymer blends of this invention are useful for making molded objects in the automotive industry such as dash board molding and panels, and in household items such as drinking tumblers and the like.

EXAMPLE I

Resin compositions were prepared by the blending of a conventional 77/23 weight ratio styrene/acrylonitrile (S/AN) resin, a commercially available rubbery 75/25 weight ratio butadiene/styrene (Bd/S) block copolymer, a commercially available 75/25 weight ratio butadiene/acrylonitrile (Bd/AN) rubber, and bis(alpha,alpha-dimethylbenzyl) peroxide. The amounts styrene/acrylonitrile resin and total rubber components were held constant. One control run was made without the butadiene/acrylonitrile rubber, another without the butadiene/styrene rubber block copolymer, and one without the peroxide in order to determine the effect on the tensile strength, elongation, and Izod impact strength.

Blending was conducted in an internal mixer (Brabender Plastograph). The chamber was flushed with nitrogen after which the styrene/acrylonitrile resin was introduced and mixed at slow speed until it fluxed. The rubbery butadiene/styrene block copolymer and the butadiene/acrylonitrile rubber were then added and the materials were mixed 3 minutes under nitrogen with the mixer operating at 100 r.p.m. The peroxide was then added, the vacuum head was closed, and the chamber was evacuated. Mixing was continued at 100 r.p.m. for 7 minutes.

After removing the blends from the mixer, they were compression molded at 350° F. into sheets 1/16 inch in thickness. The sheets were cut into 1/2 inch strips from which dumbbell specimens were machined. A 2-inch gage length was used for the test specimens and the width in the gage length area was 1/4 inch. Tensile strength and elongation were measured at a drawing rate of 0.2 inch per minute. Izod impact strength was also measured. The quantities of the several materials utilized in the compositions and physical properties are shown in Table I as follows:

strength and elongation were high in control run 1, the impact strength was low.

The styrene/butadiene block copolymer employed in the composition was prepared in accordance with the following recipe:

Styrene, parts by weight _____ 80
1,3-butadiene, parts by weight _____ 20
Cyclohexane, parts by weight _____ 460
n-Butyllithium, mhm.[1] _____ 0.3
Temperature, ° F. _____ 150–200
Time, hours _____ 1

[1] Mhm.=gram millimoles per 100 grams monomer.

TABLE I

| | 1 | 2 | 3 | 4 | 5 | 6 | 7 | 8 |
|---|---|---|---|---|---|---|---|---|
| S/AN resin, parts by weight | 75 | 75 | 75 | 75 | 75 | 75 | 75 | 75 |
| Bd/S block copolymer (rubber), parts by weight | 25 | 20 | 17.5 | 15 | 10 | 5 | | 17.5 |
| Bd/AN rubber, parts by weight | | 5 | 7.5 | 10 | 15 | 20 | 25 | 7.5 |
| Bis/alpha, alpha-dimethylbenzyl) peroxide, parts by weight [1] | 0.1 | 0.1 | 0.1 | 0.1 | 0.1 | 0.1 | 0.1 | |
| Mixing temperature range, ° F | 340–363 | 340–367 | 348–372 | 345–370 | 342–361 | 343–363 | 340–361 | 352 |
| Tensile, p.s.i. | 3,810 | 4,670 | 4,360 | 4,390 | 4,250 | 4,640 | 4,780 | 3,640 |
| Elongation, percent | 14.5 | 29 | 21 | 23 | 21 | 14 | 10 | 3.5 |
| Notched Izod impact, ft. lbs./in | 0.41 | 0.67 | 0.94 | 1.19 | 2.29 | 6.59 | 0.89 | 0.84 |

[1] Based on total weight of polymeric components in the composition. The amount utilized is 1.87 moles per 100 grams rubber in the composition.

The data show that tensile strength and elongation were much higher in runs 2 through 6, prepared according to the invention than they were in control runs 1 and 8. Tensile strength in run 7 was high but elongation was unduly low. Impact strength in runs 3 through 6 was higher than in any of the control runs. It was lower in run 2 than in control runs 7 and 8 but the overall properties were much better.

The rubbery butadiene/styrene block copolymer used in this example was prepared by n-hexane diluent using n-butyllithium as the initiator. Polymerization was initiated at about 150° F. and the temperature increased to about 220° F. during the reaction. On completion of the polymerization, one part by weight per 100 parts rubber of a mixture of $C_{16}$ to $C_{18}$ saturated and unsaturated fatty acids was added to inactive the catalyst and one part by weight per 100 parts rubber or 2,6-di-tert-butyl-4-methylphenol was added as antioxidant. The mixture was steam stripped and the wet rubber crum was washed and dried. The product was gel free and had an inherent viscosity (determined as disclosed in U.S. Patent 3,078,254, column 10) of 1.25.

EXAMPLE II

Resin compositions were prepared by blending a conventional 77/23 weight ratio styrene/acrylonitrile (S/AN) resin, a commercial rubbery 75/25 weight ratio butadiene/styrene (Bd/S) block copolymer, a commercial 75/25 butadiene/acrylonitrile (Bd/AN), a conventional resinous 80/20 weight ratio styrene/butadiene (S/Bd) block copolymer, and bis(alpha,alpha-dimethylbenzyl) peroxide. The first three components were the same as used in Example I. A control run was made without the butadiene/acrylonitrile rubber. The total rubber in the compositions was held constant. Blending was effected in the manner described in Example I except for addition of the resinous styrene/butadiene block copolymer as soon as the styrene/acrylonitrile resin fluxed. The quantities of materials utilized and physical properties are given in Table II.

Cyclohexane was charged to the reactor first. The reactor was then purged with nitrogen and styrene was added follower by the butyllithium. The temperature was adjusted to 150° F. and the styrene was allowed to polymerize for 30 minutes. Butadiene was introduced and polymerization was continued for 30 minutes. At the conclusion of the polymerization, the polymer was recovered by coagulation in isopropyl alcohol. It was then separated and dried. During recovery steps, approximately one part by weight per 100 parts by weight polymer of an antioxidant mixture containing equal parts by weight of a phosphinated polyalkyl polyphenol and 2,6-di-tert-butyl-4-methylphenol was added to the polymer.

EXAMPLE III

Two resinous compositions were prepared in the manner described in Example II. The components were the same as in that example except for the resinous block copolymer and the amount of peroxide in one of the runs. A conventional 75/25 weight ratio styrene/butadiene (S/Bd) resinous block copolymer was used in these compositions instead of the 80/20 styrene/butadiene block copolymer of Example II. The 75/25 S/Bd copolymer was prepared in accordance with the following recipe:

1,3-butadiene, parts by weight _____ 25
Styrene, parts by weight _____ 75
Cyclohexane, parts by weight _____ 1000
n-butyllithium, mhm. _____ [1] 0.066–0.090
Initiation temperature, ° F. _____ 180
Time, minutes _____ 30
Conversion, percent _____ 100

[1] Twelve 80-gallon reactor batches were prepared and the products were blended.

The product was stabilized with one part by weight of Agerite Geltrol (44 mole percent alkyl-substituted triphenyl phosphite and 56 mole percent alkyl-substituted

TABLE II

| | 1 | 2 | 3 | 4 |
|---|---|---|---|---|
| S/AN resin, parts by weight | 70 | 70 | 70 | 70 |
| Bd/S block coploymer (rubber), parts by weight | 25 | 20 | 17.5 | 15 |
| Bd/AN rubber, parts by weight | | 5 | 7.5 | 10 |
| S/Bd block copolymer (resin), parts by weight | 5 | 5 | 5 | 5 |
| Bis(alpha,alpha-dimethylbenzyl) peroxide, percent [1] | 0.1 | 0.1 | 0.1 | 0.1 |
| Mixing temperature range, ° F | 349–369 | 336–363 | 332–365 | 340–367 |
| Tensile, p.s.i. | 2,940 | 3,440 | 3,640 | 3,75 |
| Elongation, percent | 26 | 28 | 31 | 36 |
| Notched Izod impact, ft. lbs./in | 0.59 | 1.20 | 1.71 | 2.14 |

[1] As in Example I, Table I.

These data show that runs 2, 3, and 4, made according to the invention, had high tensile strength, high elongation, and high impact strength. While the tensile phenol) and 0.1 part by weight of dilaurylthiodipropionate, each based on 100 parts by weight of the block copolymer.

The quantities of materials utilized in the compositions and physical properties are given in Table III:

TABLE III

| | 1 | 2 |
|---|---|---|
| S/AN resin, parts by weight | 70 | 70 |
| Bd/S block copolymer (rubber), parts by weight | 15 | 15 |
| Bd/AN rubber, parts by weight | 10 | 10 |
| S/Bd block copolymer (resin), parts by weight | 5 | 5 |
| Bis(alpha,alpha-dimethylbenzyl) peroxide, percent [1] | 0.25 | 0.1 |
| Mixing temperature range, °F | 338–369 | 342–362 |
| Tensile, p.s.i. | 3,810 | 3,950 |
| Elongation, percent | 59 | 32 |
| Notched Izod impact, ft. lb./in | 1.93 | 2.39 |

[1] As in Example I, Table I.

These data show that both compositions had an excellent combination of tensile, elongation, and impact properties.

EXAMPLE IV

To show the advantages of applicants' invention are obtained by employing a rubbery butadiene/styrene block copolymer and not obtained by employing a rubbery butadiene/styrene random copolymer additional runs were made using the block copolymer or a random copolymer in lieu thereof, both runs with and without the peroxide additive. The composition for each run was as follows:

TABLE IV

| | 1 | [3] 2 | 3 | 4 |
|---|---|---|---|---|
| S/AN resin, parts by weight | 75 | 75 | 75 | 75 |
| Bd/AN rubber, parts by weight | 7.5 | 7.5 | 25 | 7.5 |
| Bd/S block copolymer (rubber), parts by weight | 17.5 | 17.5 | | |
| Bd/S emulsion copolymer (rubber), parts by weight [1] | | | | 17.5 |
| Bis(alpha,alpha-dimethylbenzyl) peroxide, percent [2] | | 0.2 | | |
| High abrasion furnace carbon black, percent [2] | 0.5 | 0.5 | 0.5 | 0.5 |

[1] Random copolymer prepared by emulsion polymerization; bound styrene, 23.5 weight percent; ML-4 at 212° F., 52 (Philprene 1502).
[2] Based on total weight of polymeric components in the composition.
[3] Invention.

Blending was effected in the manner described in Example I. The styrene/acrylonitrile resin, the butadiene/acrylonitrile rubber, and the butadiene/styrene block copolymer were the same as employed in Example I. Carbon black was added in order that the effect of aging on the appearance of the samples (dulling of surface, frosty appearance, white coating) could be detected easily.

After removing the blends from the mixer, samples were compression molded at 350° F. into thin sheets (10 to 20 mils thick). Polished steel plates were used for the molding operation in order that the surface of the test specimens would be glossy. Samples of each of the four compositions were aged at room temperature by placing them on a window sill with eastern exposure. Observations made after aging 23 days were as follows:

TABLE V

| Run No. | Rating | Comments |
|---|---|---|
| 1 | 2 | Surface beginning to take on a dull appearance. |
| 2 (Inv.) | 1 | No noticeable change in surface. |
| 3 | 4 | Considerable powdery coating on surface. |
| 4 | 3 | Surface slightly frosty; duller than (1). |

These data show that the use of both the peroxide component and the block copolymer were necessary to obtain a stable polymer blend, run 2, since when the polymeric components were the same but the peroxide was omitted, run 1, the surface of the polymer began to take on a dull appearance upon aging and, when a random copolymer was substituted for the block copolymer, runs 3 and 4, a considerable change in the polymer's surface was obtained upon again whether the peroxide was present or not.

Reasonable variation and modification are possible within the scope of this disclosure without departing from the spirit and scope thereof.

That which is claimed is:

1. A method for making a resinous composition of improved properties comprising forming a blend of (1) from about 50 to about 93 weight percent of at least one monovinyl substituted aromatic compound/acrylonitrile copolymer, (2) from about 50 to about 93 weight percent of at least one rubbery block copolymer formed from at least one conjugated diene and at least one monovinyl substituted aromatic compound, (3) from 0 to about 20 weight percent of at least one resinous block copolymer formed from at least one conjugated diene and at least one monovinyl substituted aromatic compound, (4) from about 2 to about 20 weight percent of at least one rubbery random copolymer formed from at least one conjugated diene and acrylonitrile, all weight percents being based on the total weight of the polymers in the blend, and (5) at least one peroxy oxygen-containing material; and subjecting said blend to a temperature at least sufficient to decompose the peroxy oxygen-containing material.

2. The method according to claim 1 wherein the blend contains from about 0.5 to about 20 weight percent of (3).

3. The method according to claim 2 wherein the conjugated dienes in the blend contain from 4 to 10 carbon atoms per molecule, inclusive, and the monovinyl substituted aromatic compounds in the blend contain from 8 to 12 carbon atoms per molecule, inclusive.

4. The method according to claim 2 wherein component (1) contains from about 20 to about 40 weight percent acrylonitrile, the remainder being essentially at least one monovinyl substituted aromatic compound, component (2) contains from about 50 to about 95 weight percent conjugated diene and from about 5 to about 50 weight percent monovinyl substituted aromatic compound, both weight per cents being based on the total weight of the rubbery block copolymer, said rubbery block copolymer contains at least one block containing at least 50 weight conjugated diene based on the total weight of the rubbery block and at least one monovinyl substituted aromatic compound block containing at least 80 weight percent monovinyl substituted aromatic compound, the weight percent being based on the total weight of the monovinyl substituted aromatic block, component (3) when present contains from about 50 to about 95 weight percent monovinyl substituted aromatic compound and from about 5 to about 50 weight percent conjugated diene, both weight percents being based on the total weight of the resinous block copolymer, said resinous block copolymer containing at least one monovinyl substituted aromatic compound block containing at least 90 weight percent monovinyl substituted aromatic compound, the weight percent being based on the total weight of the monovinyl substituted aromatic block, and at least one conjugated diene block containing at least 50 weight percent conjugated diene, the weight percent being based on the total weight of the conjugated diene block, and component (4) contains from about 15 to about 40 weight percent acrylonitrile and from about 60 to about 85 weight percent of at least one conjugated diene, both weight percents being based on the total weight of the rubbery random copolymer.

5. The method according to claim 2 wherein from about 0.25 to about 6 gram millimoles of peroxy oxygen-containing material per 100 grams of rubber present in the blend is employed, and the blend is heated to at least 250° F. during at least one of forming said blend and after said blend is formed.

6. The method according to claim 2 wherein (1) is a copolymer of styrene and acrylonitrile, (2) is a rubbery block copolymer of butadiene and styrene, (3) is not present, (4) is a rubbery random copolymer of butadiene and acrylonitrile, from about 0.25 to about 6 gram millimoles of peroxy oxygen-containing material per 100 grams of rubber present in the blend is employed, and the blend is heated to a temperature of at least 250° F. during at least one of forming said blend and after said blend is formed.

7. The method according to claim 6 wherein (3) is present as a resinous block copolymer of styrene and butadiene and the peroxy oxygen-containing material employed is bis(alpha,alpha-dimethylbenzyl) peroxide.

8. The method according to claim 3 wherein (1) is a copolymer of styrene and acrylonitrile, (2) is a rubbery block copolymer of isoprene and styrene, (3) is a resinous block copolymer of styrene and isoprene, (4) is a rubbery random copolymer of isoprene and acrylonitrile, from about 0.25 to about 6 gram millimoles of peroxy oxygen-containing material per 100 grams of rubber present in the blend is employed, and the blend is heated to a temperature of at least 250° F. during at least one of forming said blend and after said blend is formed.

9. The product of claim 1.
10. The product of claim 7.

References Cited

UNITED STATES PATENTS

| | | | |
|---|---|---|---|
| 3,429,951 | 2/1969 | Childers | 260—876 |
| 3,265,765 | 8/1966 | Holden et al. | 260—876 |
| 2,802,808 | 8/1957 | Hayes | 260—876 |

MURRAY TILLMAN, Primary Examiner

C. J. SECCURO, Assistant Examiner

U.S. Cl. X.R.

260—45.85, 45.95, 892

UNITED STATES PATENT OFFICE
CERTIFICATE OF CORRECTION

Patent No. 3,497,572　　　　　　　　Dated February 24, 1970

Inventor(s) Clifford W. Childers et al.

It is certified that error appears in the above-identified patent and that said Letters Patent are hereby corrected as shown below:

Claim 1, Column 10, line 6 (original Claim 1, line 3)

"50 to about 93" should read -- 5 to about 30 --.

This was correctly stated in Paper No. 2 - mailed July 2, 1969.

SIGNED AND SEALED

JUL 14 1970

(SEAL)
Attest:

Edward M. Fletcher, Jr.
Attesting Officer

WILLIAM E. SCHUYLER, JR.
Commissioner of Patents